March 29, 1932.    A. W. KEGLER    1,851,846
TROUGH
Filed July 18, 1927    2 Sheets-Sheet 1
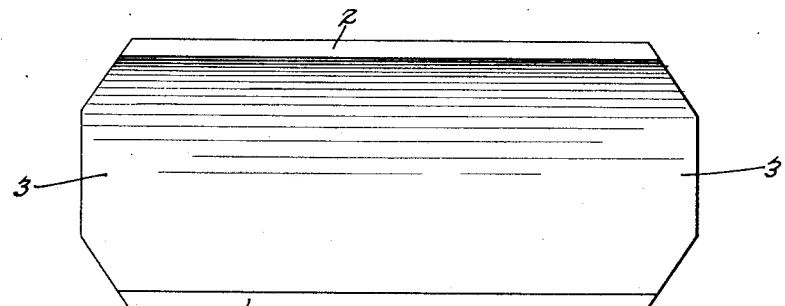
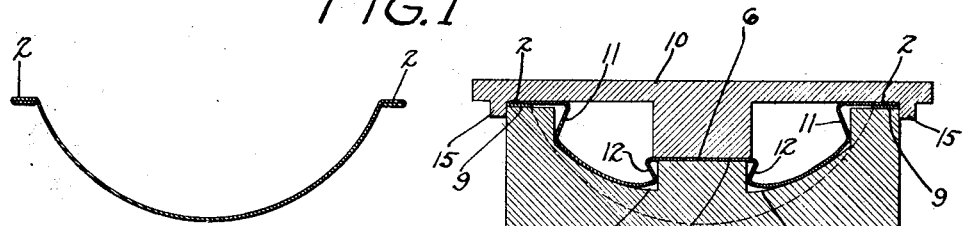
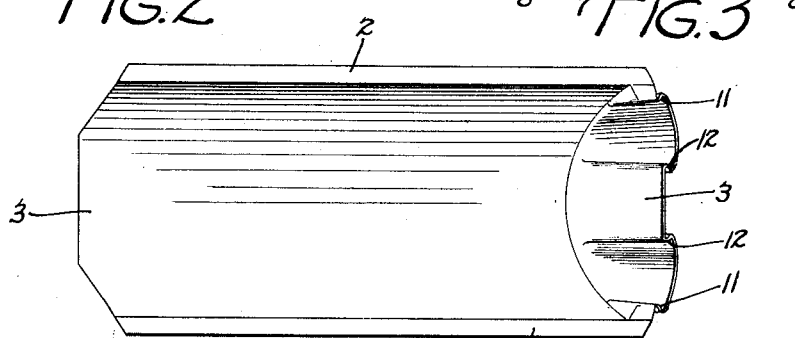
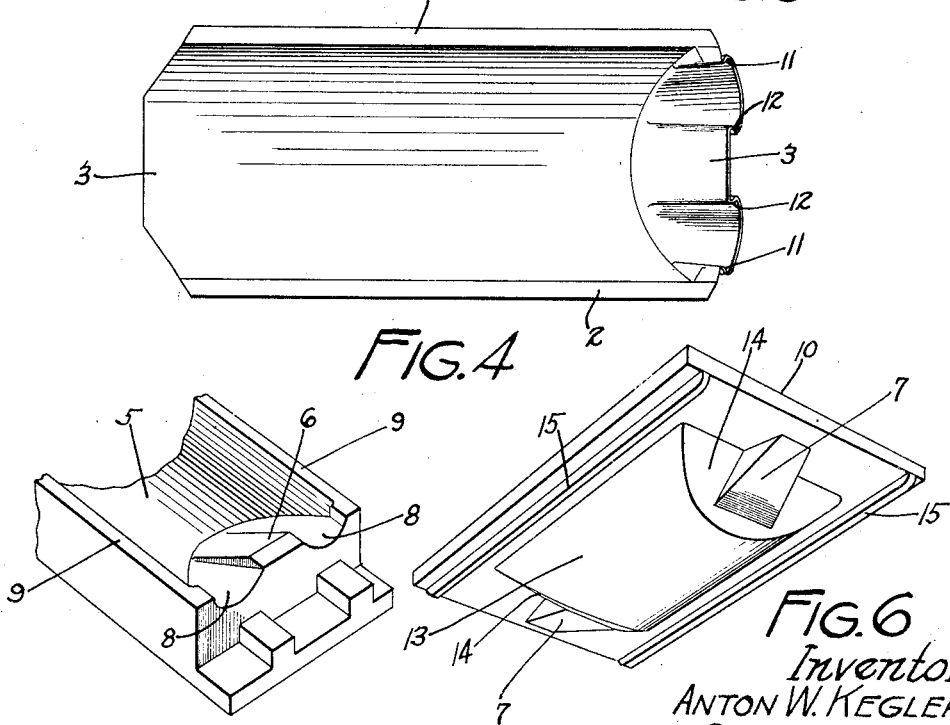
Inventor
ANTON W. KEGLER
By Paul, Paul & Moore
ATTORNEYS March 29, 1932.   A. W. KEGLER   1,851,846
TROUGH
Filed July 18, 1927   2 Sheets-Sheet 2
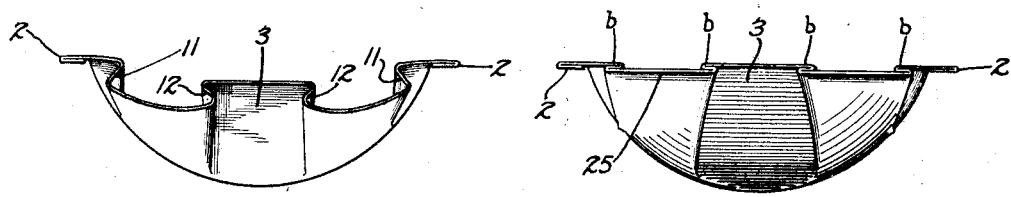
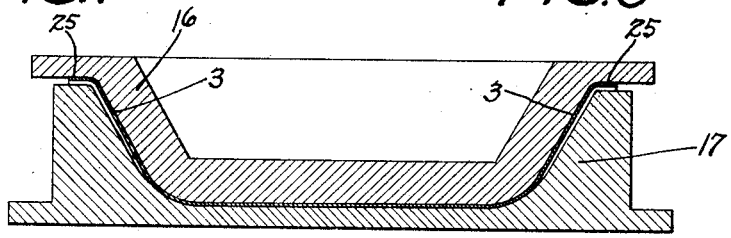
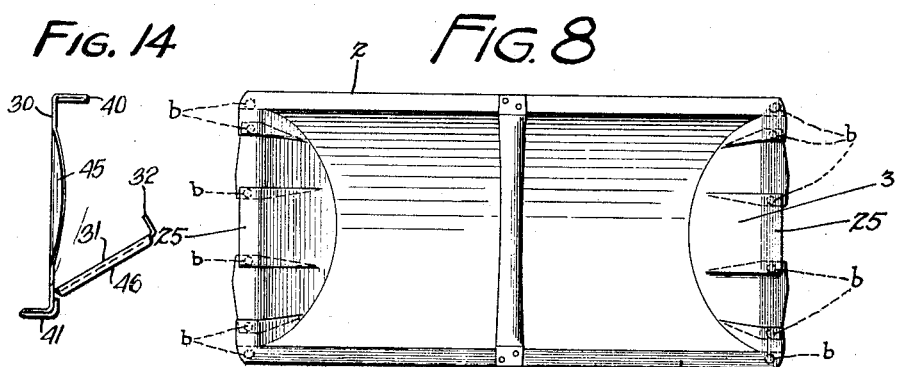
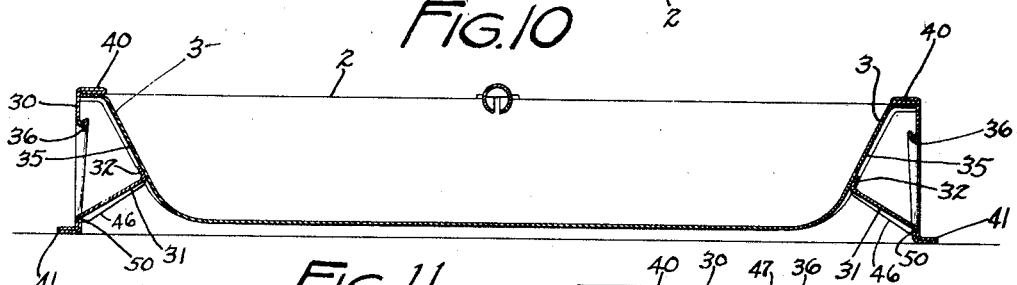
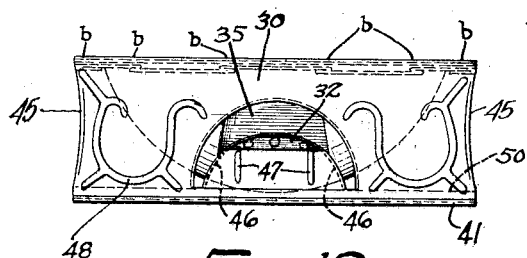
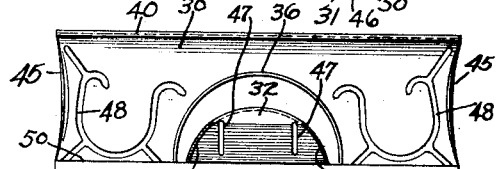
Inventor
ANTON W. KEGLER
By Paul, Paul & Moore
ATTORNEYS Patented Mar. 29, 1932

1,851,846

UNITED STATES PATENT OFFICE

ANTON W. KEGLER, OF MINNEAPOLIS, MINNESOTA, ASSIGNOR TO H. D. HUDSON MANUFACTURING COMPANY, OF MINNEAPOLIS, MINNESOTA, A CORPORATION OF MINNESOTA

TROUGH

Application filed July 18, 1927. Serial No. 206,576.

This invention relates to improvements in troughs and has among its objects to provide an improved construction, as well as a method for producing the construction. Other objects are to provide a one piece trough wherein a single blank is folded up to provide a trough, having no dirt-catching corrugations or pockets.

Features of the invention include a novel leg construction; the method of connecting the leg to the trough; the method of rigidly connecting the leg, by providing means as an integral part thereof for bracing the leg in relation to the trough; the construction of the leg per se. Other features of the invention include marginal stiffening flanges for the leg and for the integral brace portion of the leg; the over-lapping of the metal of the end portions of the trough to take up surplus metal, and to compress and flatten the metal thus taken up to provide reinforced plural ply areas at which the leg connecting or securing devices are disposed, and thus to provide such reinforcement as will permit the leg to be securely and rigidly held at its points of connection with the trough; the smoothing out of said overlapped portions to lie in coplanar relation, and thus facilitate attachment of a portion of the leg flatly against the over-lapped areas; the provision of a reinforcing lip or flange at each opposite vertical edge or terminal of the leg; and the general details of construction which contribute to production of the simplified process and product disclosed herein.

The advantages of the invention will be set forth in the description of the drawings forming a part of this application and in said drawings:

Figure 1 is a plan view of the blank after the first bending operation;

Figure 2 is a cross sectional view of the blank shown in Figure 1;

Figure 3 is a view showing the next step in the operation of forming the trough, in which the end portions of the blank are bent upwardly, to take up metal and overlap it preparatory to flattening to provide laminated areas;

Figure 4 is a plan view of the end construction after bending up as shown in Figures 3 and 7;

Figure 5 is a fragmentary perspective view of one end of the lower die, of the first set of dies, both ends being identical;

Figure 6 is a complete perspective view of the upper die, of the first set;

Figure 7 is an end view of one end of the tank after the second or flattening operation;

Figure 8 shows the second set of dies cooperating in the final operation;

Figure 9 shows an end view of the tank body after the final operation, showing how the ends are brought up and provided with flanges continuous with the side flanges with the overlapped and reinforced areas coplanar;

Figure 10 shows a plan view corresponding to Figures 8 and 9;

Figure 11 is a longitudinal vertical section through a finished tank body, including the improved end legs connected for supporting the tank;

Figure 12 is an end view of Figure 11, showing the leg;

Figure 13 is an inside face view of the leg; and

Figure 14 is a side elevation of the leg.

In forming the tank, a blank is cut to a suitable size and shape, and is then bent substantially as shown in Figures 1 and 2, to obtain a cross-sectionally circular or cylindric configuration and to provide longitudinally disposed flanges 2 reinforced by turning them upon themselves. The next operation consists in bending up the end portions 3. In bending up the metal to form the ends of this one piece trough the surplus metal must be taken care of, and means is, therefore, provided for causing the metal to partially overlap as shown in Figure 3, so that in a subsequent operation this partially overlapped metal can be compressed and flattened to provide reinforced plural ply areas at or in which the leg connecting or securing devices can be disposed, to provide such reinforcment as will permit the leg to be securely and rigidly held at its points of connection with the trough. This bending up and partial overlapping operation is performed between a first pair of specially constructed dies, best shown in Figures 3, 5 and 6.

The lower die of the first set, has an upwardly faced concave depression 5, in this instance of cylindric configuration. This depression is terminated at each end by an upwardly outwardly slanting centrally disposed portion 6 providing upwardly faced flat surfaces cooperative with corresponding surfaces 7 of the upper die, to engage the central portion of the blank adjacent its ends substantially as shown in Figure 3. At each side of the slanting portion 7 the die is cut away to provide depressions 8 to receive a surplus portion of the metal and to cause the metal to fold at points 11—12 during the bending operation represented in Figure 3. In this way and after this first operation, the metal at points 11—12 is positioned so that in a subsequent operation it may be flattened to provide plural plied and reinforced areas. This flattening operation is the final operation in which, in addition to compressing and flattening the metal, to provide the plural ply areas, the outermost portions of the end walls are brought to coplanar relation with the flanges 2, a flange 25, see Figure 8, also being simultaneously formed in this second operation.

The raised portion 7 is provided at each end of the die so that the ends may be simultaneously bent up. The lower die is further provided with longitudinally extending top surfaces 9, against which the flanges 2 rest or engage. The upper die 10, see Figure 6, is provided with a convex portion 13 which conforms to the configuration of the concave portion 5 of the lower die. This upper die is further provided with the slanting surfaces 7 which correspond to and cooperate with the slanting surfaces 6 of the lower die. The convex cylindric projection 13 has its end faces cut at an angle as shown at 14 and these faces are preferably of somewhat cylindrical configuration so as to give a rounding to the ends of the tank, and avoid sharp angles. The upper die is further provided with longitudinal ribs 15 which engage at the outer side of the lower die not only to provide lateral motions of the dies with respect to one another but to engage the outer edge of the flanges 2 and prevent outward travel of the same during the dieing operations. By this and the other means mentioned, the metal is caused to buckle and to fold regularly as shown in Figure 3.

The results of the first operation are shown in end view in Figure 7. It will be seen that the upper portion of the end has not yet been brought into coplanar relation with the flanges 2, nor have the flanges 25, shown in Figure 10, been formed. Therefore, the next operation is for the purpose of flattening the portions 11 and 12 and bringing them to a position substantially shown in Figure 9, so that the plural ply points or areas $b$ are provided, at or in which points or areas the connections between the legs and the trough body are made.

The final operation between the second pair of dies to produce the results shown in Figures 9 and 10, is shown in Figure 8. In this operation, upper and lower dies respectively designated 16 and 17 are shown cooperating to flatten the portion 12, further raise the end portions of the blank and form the flange 25 coplanar with the flanges 2. This raising operation is obtained by additionally or further bending the end portions.

Other features of the invention are, the manner of constructing the combined handle and leg, and also the manner of attaching it to the trough body. It will be understood that this handle and leg construction may be used for other purposes. In the present device each leg is provided with a punched-in portion which forms a brace by which it is connected to the article which it supports, an opening being provided through which the hand is inserted to engage the leg for lifting the trough.

The combined handle and leg pieces are identical in construction, and each is formed from a single piece of metal 30 punched out to provide a brace member 31. In this instance, the punched out portion is substantially semi-circular and is adapted to be connected by a short terminal flange 32 with the outer slanting surface of the end 35 of the trough body. These are features of the invention. The margin of the hand receiving opening formed by punching out the portion 31 is turned inwardly to form a stiffening flange 36 and the upper and lower edges of the element 30 are folded upon themselves to provide reinforced flanges 40—41. The upper flange 40, in this instance, rests upon the top of the flange 25 and is also, in this instance, connected by spot welding, the welds being at the reinforced, or plied portions $b$, see Figures 9 and 10. The flange 32 is also spot welded. No plan view showing the position of the welds between the flanges 25 and 40 has been shown but their positions are indicated at $b$ in Figures 9 and 10.

Each leg and its punched-out brace member are provided with reinforcing flanges. At those ends of the leg which assume a vertical position when the leg is attached, the metal is bent intermediately of the vertical edge substantially as shown at 45 to form a flange which, in this instance, is of greatest depth at the middle portion of the end and tapers off in opposite directions, to merge into the narrow edge faces of the leg. These vertical end portions are, therefore, rounded, so that no raw edges are exposed. The stiffening flange 36 following the form in the opening left by striking out the brace member 31, is shown as extending entirely around the opening. Similar peripheral flanges 46 extending only partly around, are shown on the brace member, and these are turned downwardly to provide a smooth edge, as well as a stiffening flange. The brace member 31 is additionally stiffened by ribs 47 best shown in Figures 12 and 13. The scroll-like ribs 48 additionally stiffen the larger surface portions of the leg, so that a very rigid member is provided. The flanges 40—41 are stiffened by folding to provide two-ply reinforcement. The flange 41 is folded substantially as shown and has an upward extension 50 which at its upper end abuts the under surface of the brace member 31. This upward bend 50 also places the raw edge of the material so that the hands may not be cut in handling the trough, while the flange 41. acts as a foot. Likewise, the raw edges of the flanges 2 and 40 are disposed so that the fingers may not come in contact with them. The flange 36 not only forms a stiffening means, but presents a rounded smooth gripping edge so that there is no danger of cutting the hand when inserting through the hand opening preparatory to lifting. It will be noted that a feature of this invention includes a leg that also functions as a grip or handle.

A one piece seamless trough is thus provided in a very simple and inexpensive manner and reinforced areas are provided to permit the legs to be rigidly connected, or in other words to provide proper rigidity at points of connection with the legs. Heretofore the legs have been easily broken or detached largely due to the flimsy structure of that portion of the tank to which the legs were connected.

By the above method a very cheap seamless trough is provided, and also a very cheap and efficient supporting structure for the trough is provided. As shown above there are virtually only three stamping operations necessary to complete the body of the trough and substantially a single stamping operation completes a supporting element 30.

The formation indicated by the numeral 45 is such that a smooth gripping edge is provided, so that if two persons are lifting a large heavy trough, each can grip opposite edges 45 with respective hands without danger of injury. The leg structure therefore provides two means for lifting, to wit the margin 36 of the opening left by punching, and the smooth lateral margins 45, the gripping portions of each being smooth, and the structure used to obtain this smoothness also acting to stiffen the leg.

The ideas of arranging the brace 31, slanted wall 35 and leg 30 to provide a space to receive the hand, and then punching out the leg to form a bracing connection and gripping opening are valuable features. Moreover, the semi-circular formation of the brace 31 and the grip opening so that the bend line is diametric with respect to the semi-circular grip opening forms a very rigid structure which additionally reinforces the leg. Moreover, the bend line of the attaching lip 32 has the relation of a chord to the peripherally circular bracing member 31 and gives a substantial area of attachment contact with reference to the slanting surface of the receptacle.

I claim as my invention:

1. A one piece trough having the metal of its end portions overlapped to provide plural ply reinforcing areas, the areas being continued to form horizontal end flanges.

2. A one piece trough having the metal overlapped to provide end flanges marginally of its upper open side and said flanges having plural ply areas formed in said end flanges by folding the single piece of material.

3. A one piece trough including ends each having a horizontal flange as an integral continuation thereof, the metal of the flanges being overlapped and crimped to produce plural-ply reinforcing areas, and a leg for each flange having a portion secured thereto and fastened by means arranged within the plural-ply areas.

4. A one piece trough including ends each having a horizontal flange as an integral continuation thereof, the metal of the flanges being overlapped to produce plural-ply reinforcing areas, and a leg for each flange having a portion secured thereto and fastened by means arranged within the plural-ply areas, the flange, leg and connecting portion of the leg extending the full width of the trough.

5. A one piece trough including ends each having a horizontal flange as an integral continuation thereof, the metal of the flanges being overlapped to produce plural-ply reinforcing areas, and a leg for each flange having a portion secured thereto and fastened by means arranged within the plural-ply areas, and each leg having a punched out portion connected with the adjacent end wall of the tank, and the leg being spaced from the tank to receive fingers passed through the opening formed by the punching referred to.

6. A one piece trough including ends each having a horizontal flange as an integral continuation thereof, the metal of the flanges being overlapped to produce plural-ply reinforcing areas and a leg for each flange having a portion secured thereto and fastened by means arranged within the plural-ply areas, the flange and the leg and its connecting portion extending the full width of the trough, and each leg having a punched out portion connected with the adjacent end wall of the tank, and the leg being spaced from the tank to receive fingers passed through the opening formed by the punching referred to.

7. A trough formed from a single piece of material and including horizontally arranged end flanges at its open side, each end flange having reinforced areas formed by folding the material, and a foot piece for each end flange portion having a horizontal flange portion overlying and engaged therewith and secured thereto by spot welds which lie in the reinforced areas.

8. A trough formed from a single piece of material and having a circumscribing horizontally arranged flange at its open side, the transverse end portions of the flange having reinforced areas formed by folding and pressing the material, a foot piece for each end flange portion having a horizontal flange portion overlying and engaged therewith and secured thereto by spot welds which lie in the reinforced areas.

9. A trough having marginal end flanges, and independently formed legs having flanges overlapping said end flanges, and means securing the flanges together in overlapped relation.

10. In combination with a trough having end flanges, independently formed legs one for each end flange, each leg having a flange arranged in overlapping engagement with the corresponding trough end flange, and means securing each pair of flanges together, the walls and legs diverging from point of attachment toward the bottom of the trough.

11. A trough having marginal end flanges, and independently formed legs having flanges overlapping said end flanges, means securing the flanges together in overlapped relation, each leg having a punched-out brace portion having its terminal attached to the trough at a point between the flanges and the bottom of the trough, the punching providing an opening above the brace portion and below the flanges through which the fingers can be passed, and each leg being spaced from the wall of the trough to receive the fingers.

12. A trough comprising a body having upper marginal side and end reinforcing means, two legs for the trough each having upper marginal reinforcing means, the end reinforcing means of the trough and of the corresponding legs being overlappingly engaged, and means rigidly securing the overlapping reinforcing means together.

13. A trough comprising a body having upper marginal side and end reinforcing means, two legs for the trough each having upper marginal reinforcing means, the end reinforcing means of said trough and of the corresponding legs being overlappingly engaged, and means rigidly securing the overlapping reinforcing means together, the marginal reinforcing means for said legs and trough, extending the full width of the trough.

14. A trough comprising a body having upper marginal side and end reinforcing means, two legs for the trough each having upper marginal reinforcing means, the end reinforcing means of the trough and of the corresponding legs being overlappingly engaged, and means rigidly securing the overlapping reinforcing means together, the overlapped marginal reinforcing means comprising flanges which are substantially parallel with the plane of the open side of the body, and which lie in that plane.

In witness whereof, I have hereunto set my hand this 12th day of July, 1927.

ANTON W. KEGLER.